(12) United States Patent
Yan et al.

(10) Patent No.: US 11,949,238 B2
(45) Date of Patent: Apr. 2, 2024

(54) DISTRIBUTED DISPATCH METHOD FOR UBIQUITOUS POWER INTERNET OF THINGS BASED ON TRANSITION MATRIX

(71) Applicant: Tsinghua University, Beijing (CN)

(72) Inventors: Xinfei Yan, Beijing (CN); Haiwang Zhong, Beijing (CN); Jianxiao Wang, Beijing (CN); Zhenfei Tan, Beijing (CN); Qing Xia, Beijing (CN); Chongqing Kang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 472 days.

(21) Appl. No.: 17/229,104

(22) Filed: Apr. 13, 2021

(65) Prior Publication Data

US 2021/0234374 A1 Jul. 29, 2021

Related U.S. Application Data

(63) Continuation of application No. PCT/CN2019/099292, filed on Aug. 5, 2019.

(30) Foreign Application Priority Data

Jun. 5, 2019 (CN) .......................... 201910484935.4

(51) Int. Cl.
*H02J 3/38* (2006.01)
*G06F 17/17* (2006.01)
(Continued)

(52) U.S. Cl.
CPC .............. *H02J 3/381* (2013.01); *G06F 17/17* (2013.01); *H02J 3/003* (2020.01); *H04L 41/12* (2013.01); *H02J 2203/20* (2020.01)

(58) Field of Classification Search
USPC ......................................................... 700/297
See application file for complete search history.

(56) References Cited

U.S. PATENT DOCUMENTS

| 2015/0039145 | A1* | 2/2015 | Yang ......................... H02J 3/00 |
| | | | 700/291 |
| 2019/0163152 | A1* | 5/2019 | Worrall ................... H02J 3/381 |
| 2020/0301383 | A1* | 9/2020 | Reddy ..................... H02J 3/381 |

FOREIGN PATENT DOCUMENTS

| CN | 103984242 | 8/2014 |
| CN | 104701844 A * | 6/2015 |

(Continued)

OTHER PUBLICATIONS

WIPO, International Search Report for PCT/CN2019/099292, dated Mar. 9, 2020.

(Continued)

*Primary Examiner* — Mohammad Ali
*Assistant Examiner* — Joshua T Sanders
(74) *Attorney, Agent, or Firm* — Hodgson Russ LLP

(57) ABSTRACT

The disclosure provides a distributed dispatch method for ubiquitous power Internet of Things based on a transition matrix. The ubiquitous power Internet of Things includes generators. The method includes: S1, setting a marginal cost function of each of the generators, and extracting key cost parameters in the marginal cost function; S2, establishing an optimization model based on the key cost parameters of each of the generators and a communication topology of the ubiquitous power Internet of Things, and solving the optimization model to obtain an optimized transition matrix; and S3, generating a plan of a power output of each of the generators based on the optimized transition matrix and a distributed dispatch protocol to perform a distributed dispatch.

5 Claims, 2 Drawing Sheets

(51) Int. Cl.
*H02J 3/00* (2006.01)
*H04L 41/12* (2022.01)

(56) References Cited

FOREIGN PATENT DOCUMENTS

| CN | 105391056 A | * | 3/2016 | ................ H02J 3/00 |
| CN | 107947175 | | 4/2018 | |

OTHER PUBLICATIONS

CNIPA, First Office Action for CN Application No. 201910484935.4, dated Sep. 6, 2021.

* cited by examiner

DISTRIBUTED DISPATCH METHOD FOR UBIQUITOUS POWER INTERNET OF THINGS BASED ON TRANSITION MATRIX

CROSS REFERENCE TO RELATED APPLICATION

This application is a continuation of International Application No. PCT/CN2019/099292 filed on Aug. 5, 2019, which claims priority to Chinese Patent Application No. 201910484935.4 filed on Jun. 5, 2019, the entire contents of which are incorporated herein by reference.

FIELD

The disclosure generally relates to the field of dispatch technologies for power systems, and more particularly, to a distributed dispatch method for ubiquitous power Internet of Things based on a transition matrix.

BACKGROUND

The conventional centralized dispatch solution in energy Internet is facing challenges as the increasing popularity of distributed energy resources in the energy Internet.

SUMMARY

According to embodiments of the disclosure, there is provided a distributed dispatch method for ubiquitous power Internet of Things based on a transition matrix. The ubiquitous power Internet of Things includes generators. The method includes: S1, setting a marginal cost function of each of the generators, and extracting key cost parameters in the marginal cost function; S2, establishing an optimization model based on the key cost parameters of each of the generators and a communication topology of the ubiquitous power Internet of Things, and solving the optimization model to obtain an optimized transition matrix; and S3, generating a plan of a power output of each of the generators based on the optimized transition matrix and a distributed dispatch protocol to perform a distributed dispatch.

BRIEF DESCRIPTION OF THE DRAWINGS

The accompanying drawings, which are incorporated in and constitute a part of this specification, illustrate embodiments consistent with the disclosure and, together with the description, explain the principles of the disclosure.

DETAILED DESCRIPTION

The conventional centralized dispatch solution in the energy Internet centralizes communication on a central node, which strengthens possibilities of communication congestion and will cause that the entire system is down because of the failure in the central node. Recently, massive distributed energy resources are introduced into the energy Internet, which require high-bandwidth, high-reliability communication infrastructure. Distributed algorithms may realize the optimization for the energy Internet having massive distributed energy resources through local information exchange, avoiding the threat of the failure in the central node without building a centralized communication topology. The distributed dispatch method may also reduce the leakage of irrelevant information in the energy Internet to a certain extent.

In the ubiquitous power Internet of Things, a large number of intelligent terminal nodes will be added to the power system, and each intelligent terminal node will realize various functions such as information collection, information exchange, and operation coordination. The operation of simply concentrating every detail information of these massive nodes to a single node will be lack of feasibility and necessity to a certain extent. The distributed algorithms may provide supports for edge computing, so that the integration of cost information may be realized locally at the node.

The disclosure provides a distributed dispatch method for ubiquitous power Internet of Things based on a transition matrix, which may improve the operating efficiency of the dispatch solution under the distributed communication topology, and enhance the operating economy and safety of the power system.

Figure 1:
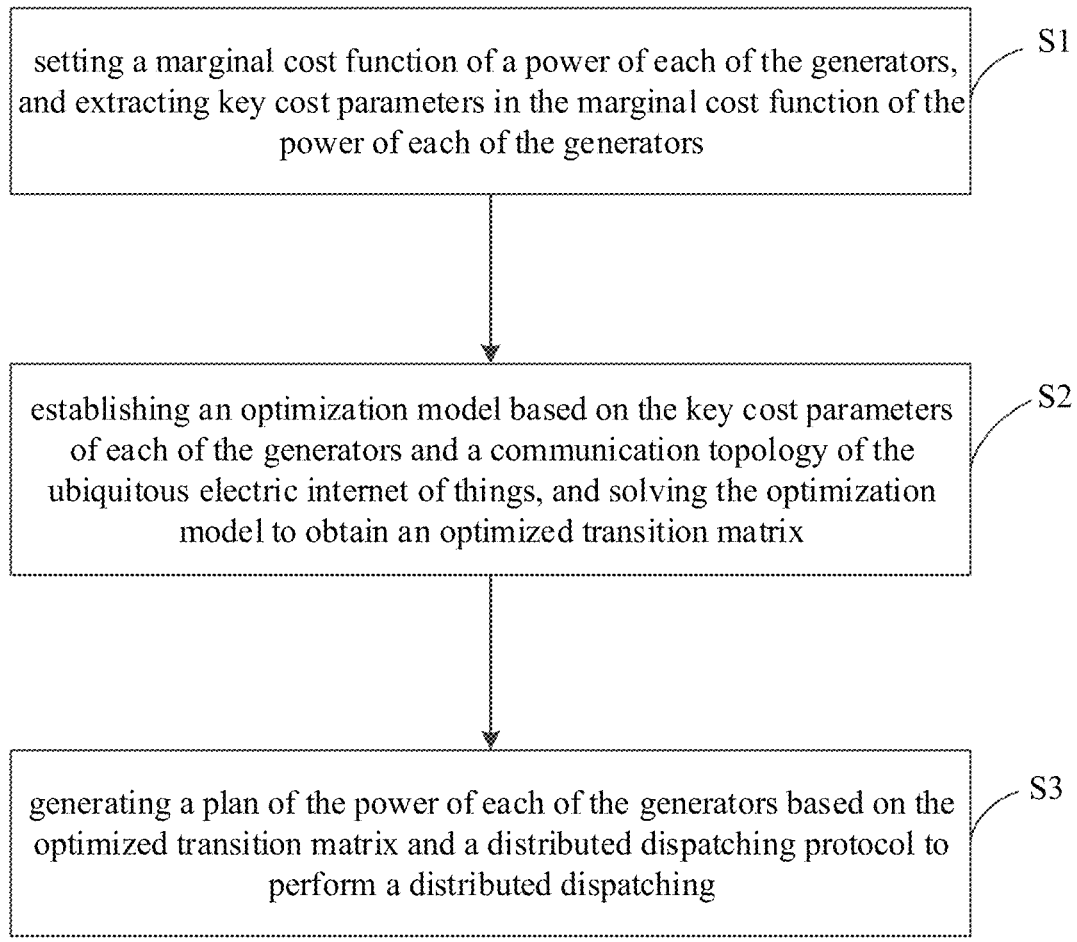
FIG. 1 is a flowchart illustrating a distributed dispatch method for ubiquitous power Internet of Things based on a transition matrix, according to some embodiments.

FIG. 1 is a flowchart illustrating a distributed dispatch method for ubiquitous power Internet of Things based on a transition matrix, according to some embodiments. As illustrated in FIG. 1, the method may include the following actions.

At block S1, a marginal cost function of each of the generators is set, and key cost parameters in the marginal cost function are extracted.

In detail, the marginal cost function relates to the power output of each of the generators. The marginal cost function of each of the generators is obtained. A marginal growth rate of a marginal cost of each of the generators with respect to the power output of each of the generators, and a hypothetical power output (under a zero marginal cost and obtained by linear extrapolation) of each of the generators may be obtained based on the marginal cost function of each of the generators.

In some embodiments, the action at block S1 may include the following S11 and S12.

S11, the marginal cost function of each of the generators is set by formulas of:

$$W_i(p_i) = \frac{(p_i - \alpha_i)^2}{2\beta_i} + \gamma_i, i = 1, 2, \ldots, N$$

$$\lambda_i(p_i) \stackrel{def}{=} \frac{\partial W_i(p_i)}{\partial p_i} = \frac{1}{\beta_i}(p_i - \alpha_i), i = 1, 2, \ldots, N$$

where,
$W_i(p_i)$ represents a cost function of a power output of generator i,
$\lambda_i(p_i)$ represents the marginal cost function of generator i,
N represents a number of the generators,
$p_i$ represents the power output of generator i,
$\alpha_i$, $\beta_i$, and $\gamma_i$ are parameters in the cost function of the power output of generator i,
$\gamma_i$ represents a hypothetical minimum cost of generator i,
$\beta_i$ represents a marginal growth rate of a marginal cost of generator i with respect to the power output of generator i,
$\alpha_i$ represents a hypothetical power output (under a zero marginal cost and obtained by linear extrapolation) of generator i.

S12, the marginal growth rate $\beta_i$ is determined based on the marginal cost function $\lambda_i(p_i)$ of generator i, and the hypothetical power output $\alpha_i$ of generator i under the zero marginal cost may be obtained by linear extrapolation on the marginal growth rate $\beta_i$, in which the key cost parameters include the marginal growth rate $\beta_i$ and the hypothetical power output $\alpha_i$.

It is understandable that there are the cost function of each of the generators and the marginal cost function of each of the generators. The marginal growth rate and the hypothetical power output in the key cost parameters may be parameters in the above two functions. The marginal growth rate may be determined based on the cost function of each of the generators. The marginal growth rate may be extrapolated linearly to obtain the hypothetical power output under the zero marginal cost.

At block S2, an optimization model is established based on the key cost parameters of each of the generators and a communication topology of the ubiquitous power Internet of Things, and the optimization model is solved to obtain an optimized transition matrix.

In some embodiments, the action at block S2 may include the following S21 and S22.

S21, an adjacency matrix corresponding to the communication topology of the ubiquitous power Internet of Things is obtained.

S22, the optimization model with respect to elements in the transition matrix is established based on the adjacency matrix and the key cost parameters of each of the generators, and the optimization model is solved by a quadratic programming solver to obtain the optimized transition matrix.

In detail, the adjacency matrix corresponding to the communication topology of the ubiquitous power Internet of Things is obtained. The optimization model with respect to all elements in the transition matrix is established based on the adjacency matrix of the communication topology of the ubiquitous power Internet of Things, and the key cost parameters of each of the generators. The optimization model with respect to all elements in the transition matrix is solved by a quadratic programming solver to obtain the optimized transition matrix. The optimized transition matrix may be divided into columns and the divided column is sent to the corresponding node in the communication topology.

Furthermore, the aforementioned transition matrix and adjacency matrix may have the same dimensions. The positions of non-zero elements of the transition matrix and adjacency matrix are the same. A sum of elements in each column of the transition matrix is 1. The transition matrix employs a vector comprising marginal growth rates as a right eigenvector with an eigenvalue of 1. The objective function of the optimization model is to minimize the Frobenius norm of the transition matrix.

At block S3, a plan of a power output of each of the generators is generated based on the optimized transition matrix and a distributed dispatch protocol to perform a distributed dispatch.

In some embodiments, the action at block S3 may include the following S31 and S32.

S31, a load demand of each node in the communication topology of the ubiquitous power Internet of Things is sent by each node, to each of the generators, and the load demand of each node is summed by each of the generators, to obtain an initial power output of each of the generators.

S32, the distributed dispatch protocol runs iteratively based on the optimized transition matrix and the initial power output of each of the generators until a marginal cost satisfies an iteration termination condition to terminate an iteration process, the plan of the power output of each of the generators is generated based on a result of the last iteration, and the power output of each of the generators in the plan is outputted to perform the distributed dispatch.

In some embodiments, S32 includes: initializing a state variable $s_i$, iteratively exchanging the state variable and updating the marginal cost $\lambda_i$, and determining whether the fluctuations of the marginal cost satisfies the iteration termination condition.

In detail, the state variable $s_i$ of generator i is initialized by a formula of:

$$s_i^{(0)} = d_i - \alpha_i$$

where, $s_i^{(0)}$ represents an initial value of the state variable $s_i$ of generator i, $d_i$ represents a load at generator i, and is equal to the initial power output of generator i, $\alpha_i$ represents a hypothetical power output of generator i obtained by linear extrapolation and under a zero marginal cost.

The state variable is exchanged iteratively and the marginal cost $\lambda_i$ is updated by formulas of:

$$s_i^{(k+1)} = \sum_{j=1}^{N} q_{ij} s_j^{(k)}$$

$$\lambda_i^{(k+1)} = s_i^{(k+1)} / \beta_i$$

where, $s_i^{(k)}$ represents the state variable at the $k^{th}$ iteration of generator i, $s_i^{(k+1)}$ represents the state variable at the $(k+1)^{th}$ iteration of generator i, $\lambda_i^{(k+1)}$ represents the marginal cost at the $(k+1)^{th}$ iteration of generator i, $q_{ij}$ represents an element of the transition matrix, $\beta_i$ represents a marginal growth rate of the marginal cost of generator i with respect to the power output of generator i.

It is determined whether the marginal cost satisfies the iteration termination condition, in which the iteration termination condition is that the iteration process is terminated when a marginal cost error is less than an error tolerance and is denoted by a formula of:

$$|\lambda_i^{(k+1)} - \lambda_i^{(k)}| < \delta$$

where, $\lambda_i^k$ represents the marginal cost at the el iteration of generator i, $\delta$ represents the error tolerance;

in which the plan of the power output of each of the generators is generated based on $s_i^{(k+1)}$ when the iteration process terminates, and each of the generators outputs the power output based on the plan to perform the distributed dispatch.

In detail, each node in the ubiquitous power Internet of Things may send its load demand to any generator. Each generator sums up the obtained load demands to obtain the initial power output of the corresponding generator. The distributed dispatch protocol runs iteratively based on the transition matrix and the initial power output of each of the generators. The power output of each of the generators may be redistributed until the marginal cost error is less than the error tolerance, and the iteration process terminates. Each of the generators outputs the power output based on the plan obtained when the iteration process terminates, realizing the distributed dispatch.

Figure 2:
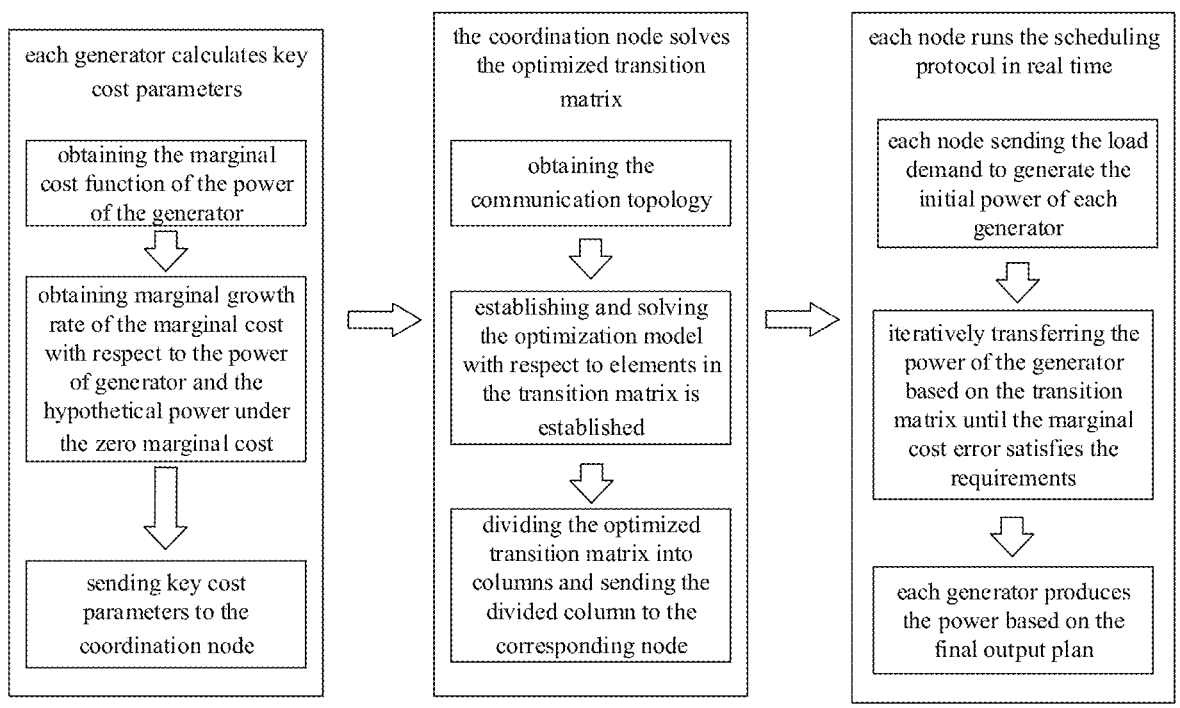
FIG. 2 is a block diagram illustrating a distributed dispatch method for ubiquitous power Internet of Things based on a transition matrix, according to some embodiments.

In summary, specific embodiments may be used to describe in detail the distributed dispatch method for ubiquitous power Internet of Things based on the transition matrix as illustrated in FIG. 2.

(1) Each generator extracts key cost parameters based on the cost function of the corresponding generator. This action may include the following. The marginal cost function of the corresponding generator may be obtained. The marginal growth rate of a marginal cost of the corresponding generator with respect to the power output of the corresponding generator may be determined based on the marginal cost function of the corresponding generator. The hypothetical power output of the corresponding generator under the zero marginal cost may also be obtained by linear extrapolation. The key cost parameters may be sent to the coordination node.

(1-1) The marginal cost function of the generator may be obtained.

The cost function of the generator may be set. The cost function of the generator may include the following based on actual situations:

$$W_i(p_i) = \frac{(p_i - \alpha_i)^2}{2\beta_i} + \gamma_i, i = 1, 2, \ldots, N \quad (1)$$

$$\lambda_i(p_i) \stackrel{def}{=} \frac{\partial W_i(p_i)}{\partial p_i} = \frac{1}{\beta_i}(p_i - \alpha_i), i = 1, 2, \ldots, N \quad (2)$$

where,

N represents the number of the generators, $p_i$ represents the power output of generator i, $W_i(p_i)$ represents the cost function of generator i, $\lambda_i(p_i)$ represents the marginal cost function of generator i, $\alpha_i$, $\beta_i$, and $\gamma_i$ are the parameters in the cost function of generator i, $\gamma_i$ represents a hypothetical minimum cost of generator i, $\beta_i$ represents a marginal growth rate of a marginal cost of generator i with respect to the power output of generator i, $\alpha_i$ represents a hypothetical power output (under a zero marginal cost and obtained by linear extrapolation) of generator i.

(1-2) In formula (2), the marginal growth rate $\beta_i$ of the marginal cost of generator i with respect to the power output of generator i and the hypothetical power output $\alpha_i$ (under the zero marginal cost and obtained by linear extrapolation) of generator i, which are obtained by the marginal cost function of the generator, may be obtained.

(1-3) The obtained key cost parameters $\beta_i$ and $\alpha_i$ are sent to the coordination node.

(2) The optimized transition matrix may be solved.

The adjacency matrix corresponding to the communication topology is obtained. The optimization model with respect to all elements in the transition matrix is established based on the adjacency matrix of the communication topology, and the key cost parameters of each of the generators. The optimization model with respect to all elements in the transition matrix is solved by a quadratic programming solver to obtain the optimized transition matrix. The optimized transition matrix may be divided into columns and the divided column is sent to the corresponding node in the communication topology.

(2-1) The adjacency matrix corresponding to the communication topology may be obtained. In some embodiments of the disclosure, it may be assumed that there is and only one generator in each node of the ubiquitous power Internet of Things. The adjacency matrix of N×N may be established based on the communication topology, in which the elements of the established adjacency matrix may be 0 and 1. The element in the $i^{th}$ row and the $j^{th}$ column of the adjacency matrix has a value of 1, which may indicate that node j can send information to node i, but the element in the $i^{th}$ row and the $j^{th}$ column of the adjacency matrix has a value of 0, which may indicate that node j cannot send information to node i. That is:

$$A = [a_{ij}]_{N \times N} \quad (3)$$

$$a_{ij} = \begin{cases} 1 & \text{node } j \text{ can send information to node } i \\ 0 & \text{node } j \text{ cannot send information to node } i \end{cases}$$

where, A represents the adjacency matrix corresponding to the communication topology.

(2-2) The optimization model with respect to all elements in the transition matrix is established, and the optimization model with respect to all elements in the transition matrix is solved by a quadratic programming solver.

The optimization model may be denoted by a following form:

$$\min_{q_{ij}} \|Q\|_F^2 = \sum_{i=1}^N \sum_{j=1}^N q_{ij}^2 \quad (4)$$

$$q_{ij} \begin{cases} \geq 0 & \text{if } a_{ij} = 1 \\ = 0 & \text{if } a_{ij} = 0 \end{cases} \forall i, j = 1, 2, \ldots N, \quad (5)$$

$$\sum_{i=1}^N q_{ij} = 1 \ \forall j = 1, 2, \ldots, N \quad (6)$$

$$\sum_{j=1}^N q_{ij} \beta_j = \beta_i \ \forall i = 1, 2, \ldots, N \quad (7)$$

where,

Q represents the transition matrix, $\|Q\|_F$ represents the Frobenius norm of the transition matrix, $q_{ij}$ represents an element in the transition matrix, $\beta_i$ represents the key cost parameter of generator i, and the corresponding specific meaning is the marginal growth rate of the marginal cost of generator i with respect to the power output of generator i, The objective function expressed by formula (4) is the square of the Frobenius norm of the transition matrix. Formula (5) indicates that the positions of non-zero elements in the transition matrix Q correspond to the adjacency matrix A. Formula (6) indicates the sum of the elements in each column of the transition matrix is 1. Formula (7) indicates that the transition matrix has a right eigenvector $\beta = [\beta_1, \beta_2, \ldots, \beta_N]^T$ with 1 as the eigenvalue.

The quadratic programming solver (e.g., commercial software such as cplex) may be used to solve formula (4) to obtain each element $q_{ij}$ in the transition matrix to obtain the optimized transition matrix. Furthermore:

$$\|Q\|_F \geq \sqrt{\sum_{i=1}^{N} |\sigma_i|^2} \qquad (8)$$

$$1 = |\sigma_1| \geq |\sigma_2| \geq \ldots \geq |\sigma_N| \qquad (9)$$

where,
$\sigma_i$ represents the $i^{th}$ largest eigenvalue in the transition matrix and sorted by modulus. Since the Frobenius norm of the optimized transition matrix is the smallest, $\sigma_i$ is also close to the smallest value. The smaller the value $\sigma_i$, the faster the convergence rate.

(2-3) The optimized transition matrix may be divided into columns and the divided column may be sent to the corresponding node in the communication topology. For node j, the coordinating node will only send the $j^{th}$ column of the transition matrix.

(3) The distributed dispatch of the generators may be realized based on the optimized transition matrix and the distributed dispatch protocol.

Each node in the ubiquitous power Internet of Things may send its load demand to any generator. Each generator sums up the obtained load demands to obtain the initial power output of the corresponding generator. It runs iteratively based on the transition matrix to redistribute the power output of each of the generators until the marginal cost error is less than the error tolerance, and the iteration process terminates. Each of the generators outputs the power output based on the plan obtained when the iteration process terminates, realizing the distributed dispatch.

(3-1) In obtaining the initial power output of each generator by adding, as a way, it is assumed that each node has a generator. Therefore, the load of each node is the initial power output of the generator.

(3-2) The distributed dispatch protocol runs iteratively based on the transition matrix. The protocol has three actions: initializing a state variable $s_i$, iteratively exchanging the state variable and updating the marginal cost $\lambda_i$, and determining whether the fluctuations of the marginal cost satisfies the iteration termination condition.

(3-2-1) The state variable $s_i$ of generator i is initialized by a formula of:

$$s_i^{(0)} = d_i - \alpha_i \qquad (10)$$

where,
$s_i^{(0)}$ represents an initial value of the state variable $s_i$ of generator i,
$d_i$ represents a load at generator i, and is equal to the initial power output of generator i,
$\alpha_i$ represents a hypothetical power output of generator i obtained by linear extrapolation and under a zero marginal cost.

(3-2-2) The state variable is exchanged iteratively and the marginal cost $\lambda_i$ is updated by formulas of:

$$s_i^{(k+1)} = \sum_{j=1}^{N} q_{ij} s_j^{(k)} \qquad (11)$$

$$\lambda_i^{(k+1)} = s_i^{(k+1)} / \beta_i \qquad (12)$$

where,
$s_i^{(k)}$ represents the state variable at the $k^{th}$ iteration of generator i,
$s_i^{(k+1)}$ represents the state variable at the $(k+1)^{th}$ iteration of generator i,
$\lambda_i^{(k+1)}$ represents the marginal cost at the $(k+1)^{th}$ iteration of generator i,
$q_{ij}$ represents an element of the transition matrix,
$\beta_i$ represents a marginal growth rate of the marginal cost of generator i with respect to the power output of generator i.

(3-2-3) Judgement of iteration termination condition. If the following convergence criteria are satisfied during the iteration process, the iteration process is terminated:

$$|\lambda_i^{(k+1)} - \lambda_i^{(k)}| < \delta \qquad (13)$$

where,
$\lambda_i^k$ represents the marginal cost at the $k^{th}$ iteration of generator i, which represents the requirement of marginal cost accuracy.

(3-3) Each of the generators outputs the power output based on the power output $s_i^{(k+1)}$ when the iteration process terminates.

With the distributed dispatch method for ubiquitous power Internet of Things based on a transition matrix, the key cost parameters may be extracted based on the marginal cost function of the power output of each of the generators. The key cost parameters may be combined with the information of the communication topology of the ubiquitous power Internet of Things and the optimized transition matrix may be obtained. Therefore, the distributed dispatch of the generators may be realized based on the transition matrix, which may improve the operating efficiency of the dispatch solution under the distributed communication topology, and enhance the operating economy and safety of the power system.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A distributed dispatch method for ubiquitous power internet of things based on a transition matrix, wherein the ubiquitous power internet of things comprises generators, and the method comprises:
S1, setting a marginal cost function of each of the generators, and extracting key cost parameters in the marginal cost function;
S2, establishing an optimization model based on the key cost parameters of each of the generators and a communication topology of the ubiquitous power internet of things, and solving the optimization model to obtain an optimized transition matrix; and
S3, generating a plan of a power output of each of the generators based on the optimized transition matrix and a distributed dispatch protocol to perform a distributed dispatch,
wherein S3 comprises:
S31, sending a load demand of each node in the communication topology of the ubiquitous power internet of things, by each node, to each of the generators, and summing by each of the generators, the load demand of each node to obtain an initial power output of each of the generators; and
S32, iteratively running the distributed dispatch protocol based on the optimized transition matrix and the initial power output of each of the generators until a marginal cost satisfies an iteration termination condition to terminate an iteration process, generating the plan of the power output of each of the generators based on a result of the last iteration, and outputting the power output of each of the generators in the plan to perform the distributed dispatch.

2. The method of claim 1, wherein S1 comprises:
S11, setting the marginal cost function of each of the generators by formulas of:

$$W_i(p_i) = \frac{(p_i - \alpha_i)^2}{2\beta_i} + \gamma_i, i = 1, 2, \ldots, N$$

$$\lambda_i(p_i) \stackrel{def}{=} \frac{\partial W_i(p_i)}{\partial p_i} = \frac{1}{\beta_i}(p_i - \alpha_i), i = 1, 2, \ldots, N$$

where
$W_i(p_i)$ represents a cost function of a power output of generator i,
$\lambda_i(p_i)$ represents the marginal cost function of generator i,
N represents a number of the generators,
$p_i$ represents the power output of generator i,
$\gamma_i$ represents a hypothetical minimum cost of generator i,
$\beta_i$ represents a marginal growth rate of a marginal cost of generator i with respect to the power output of generator i,
$\alpha_i$ represents a hypothetical power output of generator i obtained by linear extrapolation, under a zero marginal cost; and
S12, determining the marginal growth rate $\beta_i$ based on the marginal cost function of generator i, and obtaining the hypothetical power output $\alpha_i$ of generator i under the zero marginal cost by linear extrapolation based on the marginal growth rate $\beta_i$, in which the key cost parameters comprise the marginal growth rate $\beta_i$ and the hypothetical power output $\alpha_i$.

3. The method of claim 1, wherein S2 comprises:
S21, obtaining an adjacency matrix corresponding to the communication topology of the ubiquitous power internet of things; and
S22, establishing the optimization model with respect to elements in the transition matrix based on the adjacency matrix and the key cost parameters of each of the generators, and solving the optimization model by a quadratic programming solver to obtain the optimized transition matrix.

4. The method of claim 3, wherein,
the adjacency matrix and the transition matrix have the same dimensions and the same positions of non-zero elements,
a sum of elements in each column of the transition matrix is 1, and
the transition matrix employs a vector comprising marginal growth rates as a right eigenvector with an eigenvalue of 1.

5. The method of claim 1, wherein S32 comprises:
initializing a state variable $s_i$ of generator i by a formula of:

$$s_i^{(0)} = d_i - \alpha_i$$

where
$s_i^{(0)}$ represents an initial value of the state variable $s_i$ of generator i,
$d_i$ represents a load at generator i, and is equal to the initial power output of generator i,
$\alpha_i$ represents a hypothetical power output of generator i obtained by linear extrapolation, under a zero marginal cost;
iteratively exchanging the state variable and updating the marginal cost $\lambda_i$ by formulas of:

$$s_i^{(k+1)} = \sum_{j=1}^{N} q_{ij} s_j^{(k)}$$

$$\lambda_i^{(k+1)} = s_i^{(k+1)} / \beta_i$$

where,
$s_i^{(k)}$ represents the state variable at the $k^{th}$ iteration of generator i,
$s_i^{(k+1)}$ represents the state variable at the $(k+1)^{th}$ iteration of generator i,
$\lambda_i^{(k+1)}$ represents the marginal cost at the $(k+1)^{th}$ iteration of generator i,
$q_{ij}$ represents an element of the transition matrix,
$\beta_i$ represents a marginal growth rate of the marginal cost of generator i with respect to the power output of generator i;
determining whether the marginal cost satisfies the iteration termination condition, in which the iteration termination condition is that the iteration process is terminated when a marginal cost error is less than an error tolerance and is denoted by a formula of:

$$|\lambda_i^{(k+1)} - \lambda_i^{(k)}| < \delta$$

where,
$\lambda_i^k$ represents the marginal cost at the $k^{th}$ iteration of generator i,
$\delta$ represents the error tolerance;
in which the plan of the power output of each of the generators is generated based on $s_i^{(k+1)}$ when the iteration process terminates, and each of the generators outputs the power output based on the plan to perform the distributed dispatch.

* * * * *